Patented May 28, 1946

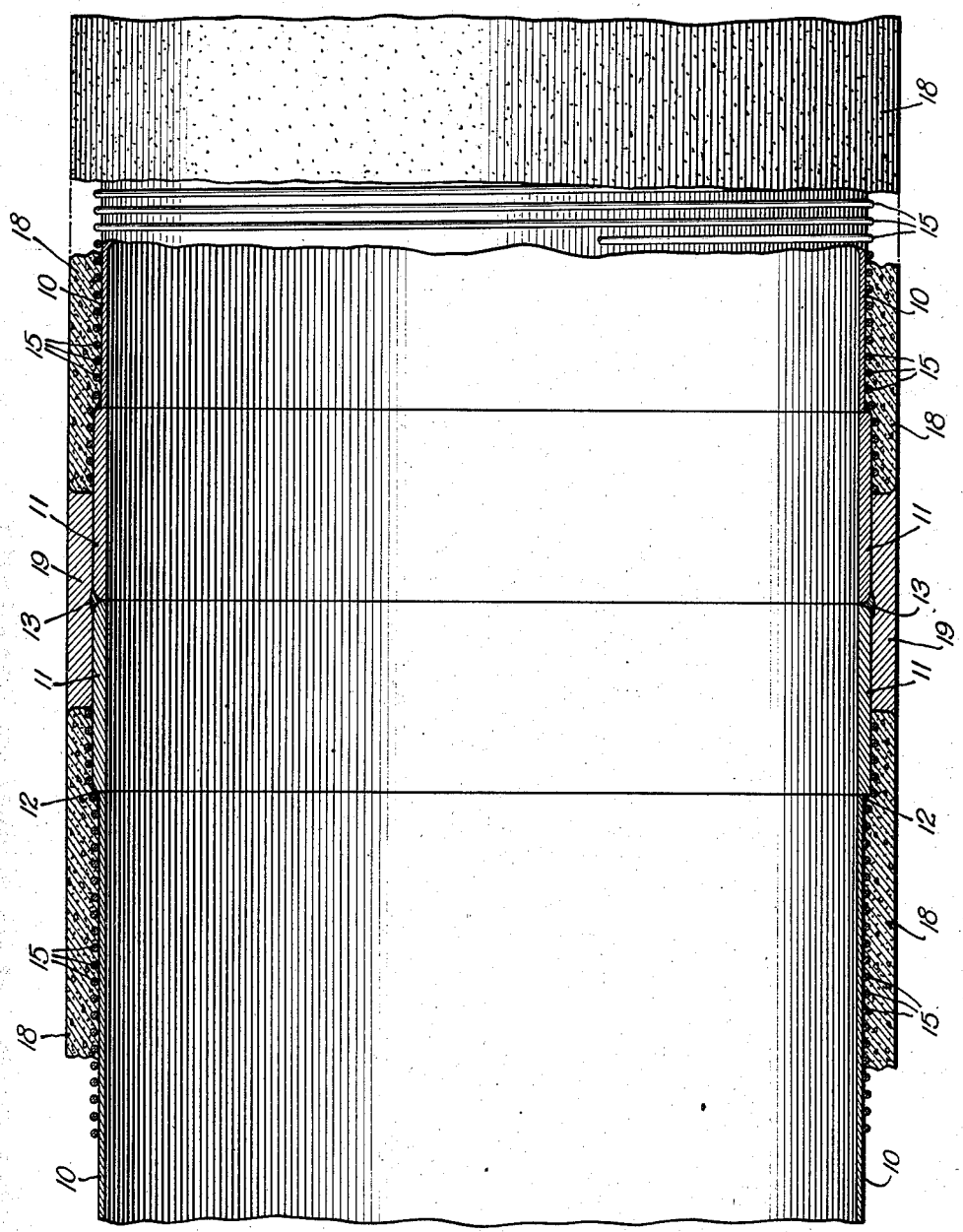

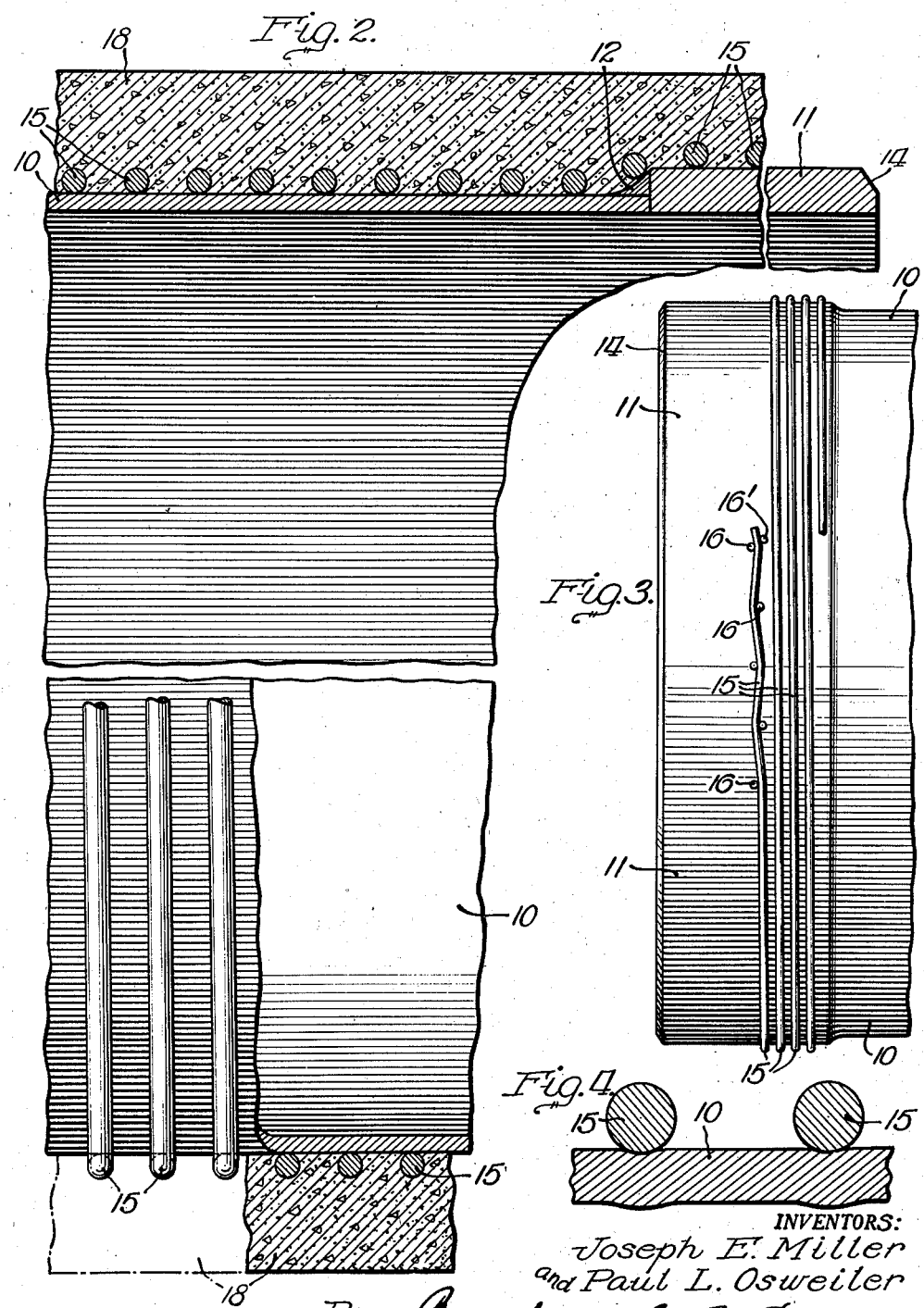

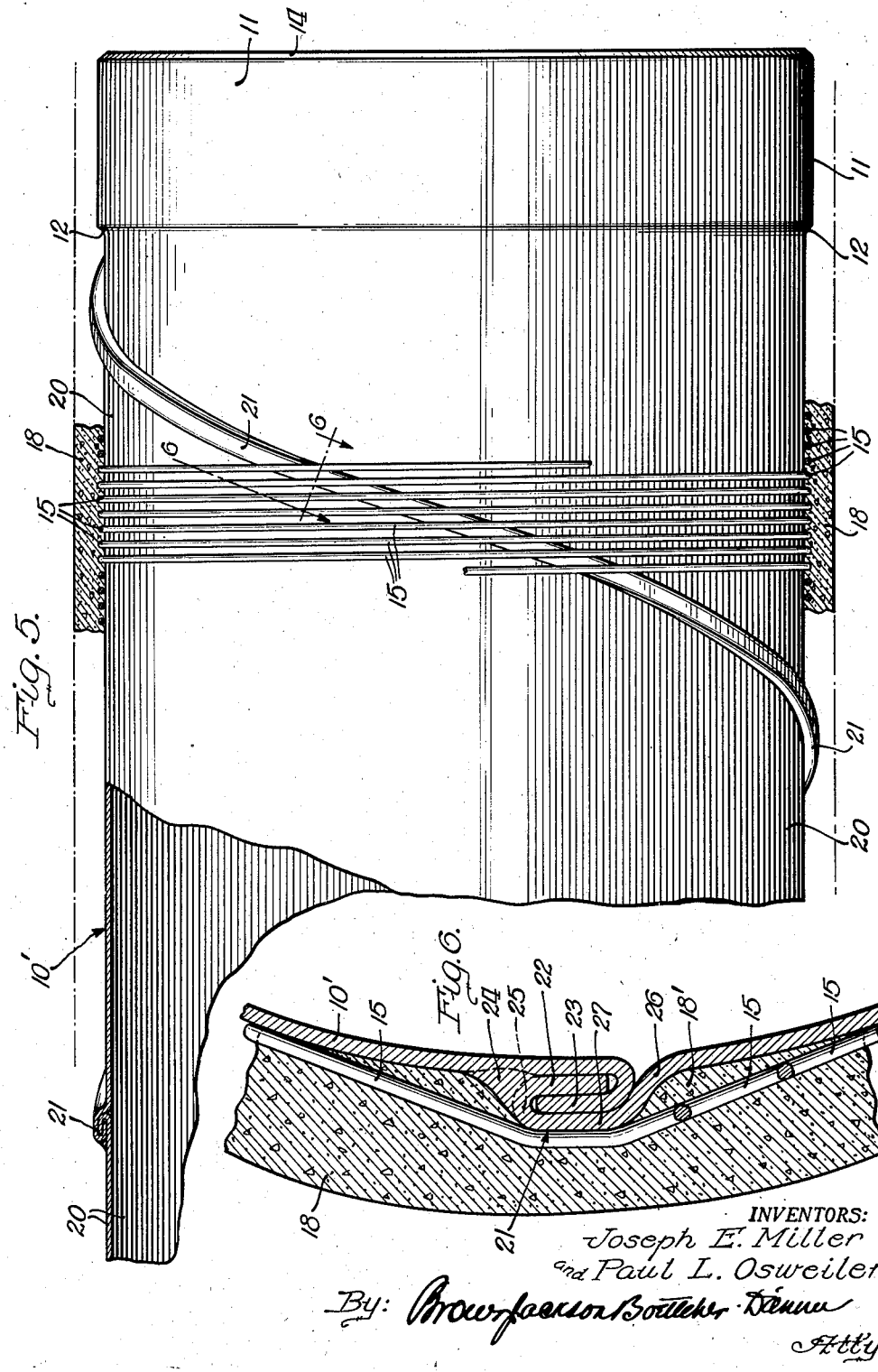

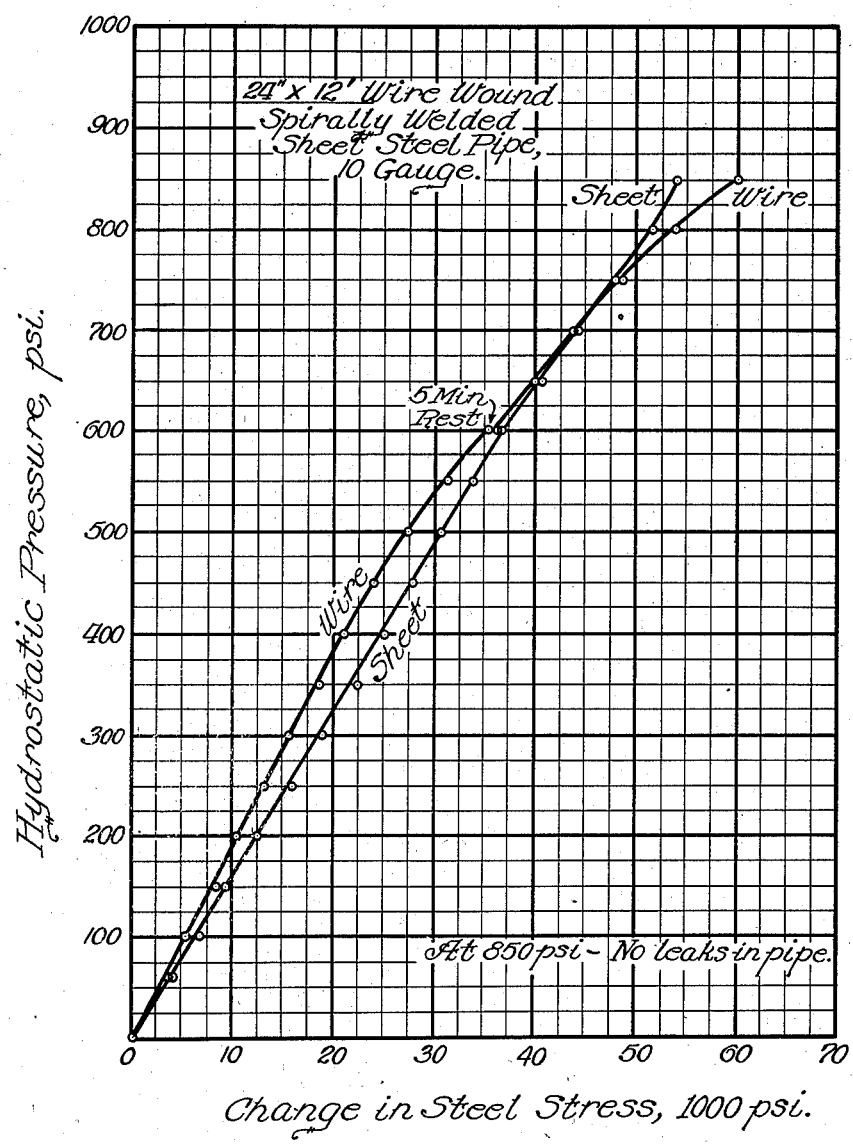

2,401,092

UNITED STATES PATENT OFFICE 2,401,092

PRESTRESSED STEEL PIPE

Joseph E. Miller, Oak Park, and Paul L. Osweiler, La Grange, Ill., assignors, by mesne assignments, to Price Brothers Company, Dayton, Ohio, a corporation of Michigan Application October 9, 1943, Serial No. 505,616

3 Claims. (Cl. 138—69)

The present invention relates to steel pipe, and has as its primary object to increase the strength of such pipe by placing a winding of steel wire around the outside of the pipe under a relatively high tension to prestress the steel wall of the pipe. The wire is of very high tensile strength, preferably in the neighborhood of 150,000 to 200,000 pounds per square inch or more, and this wire is wrapped around the pipe wall under a relatively high tension preferably in excess of 50,000 pounds per square inch, and usually in the neighborhood of 90,000 to 100,000 pounds per square inch. This very high tension of the steel wire establishes and maintains a prestressing or precompression of the pipe wall in an inward direction, which precompression may be carried up to a point closely approaching the maximum compression strength of the metal in the pipe wall. Hence, fluid pressures within the pipe acting radially outwardly against the pipe wall must first overcome this inwardly acting precompression stress before the metal in the wall is brought back to a neutral or zero stress. It is only after the wall has been brought back to this zero stress that continued rise of fluid pressure within the pipe will start developing a tensile stress in the wall. This tension stress in the pipe wall may also be carried up to a point closely approaching the maximum tension stress of the metal in the wall. Thus our improved construction of pipe resists outwardly acting fluid pressures by first utilizing the compression strength of the pipe wall, and then by utilizing the tension strength of the wall, this successive utilization of the compression strength and the tension strength resulting in a cumulative or additive value greatly exceeding either value acting alone.

The pipe wall is preferably composed of an ordinary low carbon steel for reasons of economy, and also for enabling good welding operations to be performed thereon. The steel wire, on the other hand, does not need to have any welding operations performed thereon, and hence it can be made of steel of much higher unit tensile strength than the pipe wall; i. e., it can have a tensile strength of approximately 200,000 pounds per square inch, or upwards. The steel wire does not go through any reversal of stress such as does the pipe wall, but always remains under tension. However, the higher tensile strength of the wire is developed to its maximum because, by proportioning the size of wire and closeness of the convolutions along the length of the pipe, this tensile strength of the wire can be made to equal approximately both the compression strength and the tension strength of the pipe wall. Thus, the strengths and stresses of the pipe wall and of the wire are preferably so proportioned that the wall and the wire will both reach their ultimate points of failure substantially simultaneously, which obviously means that the maximum strength of both has been developed or utilized to the utmost.

The invention has particular applicability to large diameter, thin-walled steel pipe used for long distance oil and gas lines, although the invention is not necessarily limited thereto. These lines use pipe as large as 24, 30 and 36 inches in diameter, and must be capable of sustaining pressures of several hundred pounds per square inch, which often occur during pressure surges along the line. In these long oil and gas lines a relatively small saving of metal in the wall thickness of the pipe can become a very substantial saving over the length of the entire line. The lighter pipe is also easier to transport and to lay. In our improved prestressed steel pipe we are enabled to employ a much thinner wall section than has heretofore been practicable for the same internal pressures. For example, on 24 inch pipe adapted to sustain internal pressures of approximately 200 to 300 pounds per square inch we are enabled to use No. 10 gauge sheet steel (approximately .1406 inch thickness) for constructing the pipe, which is much lighter than has heretofore been practicable.

One of the more specific improvements of our invention resides in the provision of end rings which are welded to the opposite ends of the thin-walled pipe section, and which are of thicker cross section than the pipe section, these end rings reenforcing the ends of the relatively thin pipe wall and also serving as points of anchorage for the ends of the steel wire. If the tension of the steel wire were imposed directly on the bare end of the thin-walled section, there would be the possibility or likelihood of the extreme tension of the wire causing the end of the pipe wall to crumple inwardly or to become otherwise deformed. Moreover, the point of anchorage of the wire in such thin-walled section might tear loose under extreme tension. However, by welding a heavier end ring to each end of the thin-walled section and establishing the points of anchorage of the steel wire to the end rings, the latter perform the two-fold function of reenforcing the ends of the thin-walled pipe section against inward crumpling, and also of establishing a very strong point of anchorage for the ends of the wire. The end ring at the end where the winding of the wire is begun starts the compression and stiffens the thin-walled tube in advance.

The two end rings also serve to provide for establishing butt-welded joints or other joints between adjacent lengths of pipe.

Another feature of our invention, which is preferable but not essential, resides in employing pipe of the spirally welded type wherein the presence of the spiral weld affords greater compression strength and greater tensile strength to withstand the stresses imposed on the thin-walled sections; and then winding the spiral convolutions of the steel wire in opposition to the spiral convolutions of the welded seam. This construction and arrangement has greater strength than a plain pipe of the same sectional thickness, and also avoids any tendency of the steel wire to slip in a forward direction along the line of the spiral seam. In order to increase the compression strength of the thin-walled section at the time of wrapping the steel wire thereon it may be desirable in some instances to fill the pipe with water or air under an appropriate pressure. After the wire has been wound along the entire length of the pipe and has had its far end anchored to the end ring at the other end, it may be desirable to apply an outer coating or layer of concrete or like material for anchoring all points of the wire to the pipe. This outer layer of concrete need only be an inch or so in thickness, and serves the additional purposes of preventing external corrosion and also of strengthening the pipe for handling and for resisting inwardly acting external forces.

Other objects, features, and advantages of our improved construction of prestressed steel pipe will be apparent from the following detailed description of certain preferred embodiments thereof. In the accompanying drawings illustrating such embodiments:

Figure 1 is a fragmentary axial sectional view of adjacent ends of two lengths of our improved pipe, illustrating how these ends can be welded together;

Figure 2 is a fragmentary view, partly in section and partly in elevation, with the intermediate portion broken away to show the construction on a larger scale;

Figure 3 is a fragmentary side elevational view of the other end of the pipe showing one preferred manner of anchoring the end of the high tension steel wire to the end ring;

Figure 4 is a fragmentary detail view of greatly enlarged proportions for illustrating the indentation made in the thin walled pipe by the tension of the surrounding wire;

Figure 5 is a view similar to Figure 1 but showing a modified construction employing pipe made up with a spiral interlocking welded seam;

Figure 6 is an enlarged detail section through this spiral interlocking welded seam; and Figure 7 is a graph showing test results.

Referring first to Figures 1 to 4, inclusive, the thin-walled pipe section is designated 10 in its entirety, this pipe preferably being composed of sheet steel and being either of the seamless or the seamed construction. As illustrative of typical proportions which we have found practicable or preferable, we have found that for pipe of 24 inch diameter (inside diameter) we can employ No. 10 gauge (U. S. Standard gauge) sheet steel which has a thickness of approximately .1406 inch. It will be understood that these proportions are not limitative of the invention.

Secured to the opposite ends of the sheet steel pipe 10 are the coupling devices for effecting attachment to the ends of adjacent lengths of pipe, these coupling devices preferably being in the form of end rings 11, 11. These end rings are also composed of steel, and are of considerably heavier sectional thickness than the steel pipe 10. In the assumed example of a 24 inch pipe, these end rings would preferably have a length of about 6 inches and a wall thickness of about ⅜ inch, but here again we wish to point out that these dimensions are not limitative. The steel pipe 10 and end rings 11, 11 are composed of a steel or steels which lend themselves to good welding operations. For example, the pipe and end rings are preferably composed of ordinary carbon steel or ordinary open hearth steel, having a maximum compression strength of approximately 30,000 to 35,000 pounds per square inch and having a maximum tension strength of approximately 30,000 to 35,000 pounds per square inch. The end rings are preferably welded to the pipe, as illustrated by the fillet welds 12, 12. As shown in Figure 1, when joining the abutting ends of adjacent pipe sections together in the field the opposing ends of the two end rings are joined together by a weld 13 performed in the field. The making of the weld 13 in the field is facilitated by initially forming each of the end rings with a beveled surface 14, these two beveled surfaces of abutting rings forming an annular trough for receiving the welding metal.

Referring now to the high tension steel wire, this is indicated at 15 and is preferably composed of a high strength heat treated spring steel having a tensile strength of 150,000 to 200,000 pounds per square inch, or more. In the aforementioned illustrative example of a 24 inch pipe made up of No. 10 gauge steel, this wire would preferably be of approximately No. 6 gauge (American Steel & Wire Co. or Roebling gauge), i. e., about .1920 inch in thickness, and would be wound around the pipe with a spacing of approximately ½ inch between centers. In one embodiment of pipe constructed by us the actual wire spacing using No. 6 gauge wire was 0.538 inch which gave a steel wire cross-sectional area of .0539 square inch per inch length of pipe. The sheet steel of No. 10 gauge (U. S. Standard gauge) has a cross-sectional area of .1406 square inch per length of pipe, i. e. this is the thickness of the metal times 1 inch length of the pipe. The ends of the wire 15 are anchored to the end rings 11, 11 rather than to the steel shell 10. The high tensile quality of the steel wire does not lend itself readily to the performance of a welding operation, and, accordingly, special anchoring devices are preferably formed on or carried by the end rings for attaching the wire thereto. As shown in Figure 3, one typical form of anchoring apparatus comprises a series of staggered pins 16 projecting radially outwardly from the end ring 11 and adapted to have the end of the wire laced or threaded therebetween. The pins are so spaced from each other and so disposed that the wire end must be bent in a wave-like form to thread the pins. In order to prevent the free end of the wire from working loose, an auxiliary pin 16' may be provided close enough to the end pin so that the wire is tightly wedged therebetween. This form of anchoring apparatus is fully disclosed in our prior Patent No. 2,166,847, issued July 18, 1939, on "Wire clamp," this patent also showing other forms of anchoring or clamping apparatus which may be used in lieu of the pins 16, 16'. After anchoring the end of the wire to the pins 16, 16' the pipe is revolved to wind the wire over the end rings 11, 11 and over the thin-walled section 10 to produce the approximate pitch spacing referred to above. If desired, some of the end convolutions which are wound over the end rings 11, 11 may be spaced more closely together than the convolutions extending over the thin-walled section 10. In our prior Patents No. 2,175,479, issued October 10, 1939, and No. 2,215,361, issued September 17, 1940, we have disclosed improved methods and apparatus for winding high tension wire along a pipe. The methods and apparatus disclosed in these patents can be employed for winding the wire on the pipe, or other suitable methods and apparatus may be used, if preferred. In the aforementioned typical example of a 24 inch pipe composed of No. 10 gauge sheet steel, we wound the wire 15 around the pipe at a tension of approximately 90,000 pounds per square inch. This produced a prestress or precompression in the thin-walled section 10 of approximately 34,500 pounds per square inch. This precompression of 34,5000 pounds approaches the maximum compression strength of the metal in the thin-walled section 10. In fact, the extreme tension of the wire produces a deformation of the thin-walled section which can be discerned under substantial magnification, as diagrammatically illustrated in Figure 4. The deformation is in the form of a minute spiral corrugation following the spiral of the wire. Because of this extreme tension, the provision of the heavier end rings 11 constitutes an important factor in preventing objectionable deformation of the extreme ends of the thin-walled section 10. These end rings structurally reenforce the extremities of the thin-walled section so that such extremities are not crumpled inwardly by the tension of the wire, such as would very likely be the case in the absence of the end rings 11. The end ring to which the starting end of the wire is secured serves to start the compression and to stiffen the thin-walled section 10 in advance; i. e., a substantial part of the compression exerted by the wire is transmitted through the thin-walled section 10 substantially ahead of the wire so that the tube is stiffened in advance of the wire. The limit of pressure to be carried by the thin-walled section 10 is that point at which a permanent deformation will result upon the removal of the pressure applied. The limiting stress in the steel under an applied pressure just prior to a permanent deformation is generally known as the "proportional limit" of the steel, which expression is synonymous with "elastic limit" or "yield point." It will be seen from the foregoing that when the steel wire 15 is wrapped under high tension around the ordinary steel pipe 10 it will place the steel pipe in a state of compression, i. e., the steel pipe is prestressed. Under this condition the internal pressure carried by this combination of ordinary steel pipe and tensioned steel wire, with the steel in the pipe approaching or reaching its "proportional limit," will be greater than without the use of the steel wire. A very high strength wire (180,000 p. s. i. or greater) of such size that the turns will be close together, and which is tensioned while wrapping on the steel pipe to a high percentage (50% or more) of its "proportional limit" stress will permit of much greater internal pressures to be carried in the pipe. The size of the high strength steel wire 15 and its spacing will be governed by the thickness of the ordinary steel pipe 10, together with the sum of the "proportional limit" of the ordinary steel in the pipe 10 in compression and in tension. The initial compressive stress induced in the steel pipe 10 should be nearly equal to its "proportional limit" in compression. For thin gauge sheet steel in the pipe 10, it may be desirable to have the convolutions of the wire 15 spaced relatively close together in order to avoid corrugating the pipe longitudinally between the wire wrappings.

After the far end of the wire has been anchored to the other end ring 1, as by the same type of anchoring apparatus described above for the starting end, the outside of the pipe is covered with a coating of cement mortar 18 or other suitable material, preferably to a thickness of about 1 inch and extending along the pipe to the end of the wire and the anchoring apparatus 16, 16'. This serves (1) to anchor all points of the wire to the pipe, (2) to prevent external corrosion of the pipe, and (3) to stiffen the pipe for handling and resisting inwardly acting external pressures. When the pipe is laid in the field the end rings 11 of adjacent pipe lengths are coupled or joined together and thereafter a ring of covering material 19 is placed around the joint and extending from the layer of cement mortar 18 on the one pipe length to the layer of cement mortar 18 on the other pipe length. This intermediate ring of covering material 19 may be composed of cement mortar, asphalt, or any other suitable material.

Referring now to the embodiment of our invention illustrated in Figures 5 and 6, in this embodiment we employ a spirally welded steel pipe designated 10' in its entirety, this pipe being made up of a strip or ribbon of metal 20 which is wound spirally around a mandrel or any other suitable means to provide a plurality of spirally related convolutions which are secured together by the lock seam 21. This seam 21 is a spiral interlocking welded seam which functions as an expansion joint capable of absorbing shock loads, vibration, expansion and contraction stresses and strains. It comprises the two interhooking flanges 22 and 23 formed on opposite edges of the spiral ribbon and positively compressed together. The seam is made gas and liquid tight by a continuous weld 24 extending from the bent portion 25 of the flange 22 to the adjacent body portion of the spiral ribbon. At the opposite side of the seam there is a heel which provides the expansion characteristic of the joint. This comprises the inwardly bowed or curved portion 26 which extends from the outer ply 27 of the seam to the adjacent body portion of the spiral ribbon. This curved portion 26 can flex or shift outwardly under high internal pressure, thereby providing a line of expansion which follows the interlocking seam. Because of the spiral angle of the seam, this zone or line of expansion is effective diagonally, i. e., it is effective to accommodate radial expansion and also longitudinal expansion of the pipe section 10'.

The high tensile strength steel wire 15 is wound over this pipe and over its spiral seam 20 in substantially the same manner described above, i. e., preferably at a pressure in the neighborhood of 90,000 pounds or more. The direction of winding is preferably such that the spiral of the wire is in opposition to the spiral of the seam. This avoids or diminishes any tendency of the wire to slip along the forward edge of the seam as the seam revolves up under the wire in the winding rotation of the pipe. The gauge of the metal in the pipe 10', the gauge of the wire 15, the spacing between the turns, the tension on the wire and other related factors are preferably the same as or proportional to the data given above in connection with the preceding embodiment. After the wire has been wound along the spirally welded pipe section 10', with the ends of the wire anchored to the anchoring pins 16, 16' or equivalent devices on the end rings 11, 11, the wrapping of wire is completely covered by the layer of cement mortar 18 or other suitable material. This cement is preferably made appropriately thin or is compacted so that some of the layer will fill in the space between the expansible curved portion 26 of the spiral seam and each of the convolutions of wire extending over this curved portion, as indicated at 18' in Figure 6. This filling of concrete 18' will ensure that the overlying portion of the steel wire will be deflected outwardly each time that the expansible curved portion 26 is deflected outwardly by the internal pressure. Hence, the tension normally maintained in the wire 15 is made that much more effective to resist the expansion of the spiral joint, and also to restore the curved portion 26 back to its original curvature after the abnormal pressure has subsided. The tension in the wire is effective to exert this restoring action on the curved portion 26 without the concrete filling 18', but the action is greatly enhanced by the presence of such filling.

Tests conducted on this latter embodiment of spirally welded pipe show that by virtue of prestressing it is possible to proportion the pipe wall, the steel wire, and the closeness of the turns so that the pipe wall and the steel wire fail approximately together (see Figure 7) at loads very much higher than it is possible to hold in ordinary steel pipe of comparable gauge not prestressed. In these tests we used steel pipe and steel wire of the dimensions given above, viz., a 24 inch (inside diameter) pipe of No. 10 gauge ordinary open hearth steel (Naylor spirally welded pipe), and a No. 6 gauge high strength heat treated spring steel wire (about .1920 inch diameter) having a maximum tensile strength of 205,000 to 220,000 pounds per square inch, or more, wound over the pipe section under a stress of 90,000 pounds per square inch. The actual wire spacing of this No. 6 gauge wire was .538 inch, which gave a steel wire cross sectional area of .0539 square inch per inch length of pipe. The sheet steel of No. 10 gauge has a cross-sectional area of .1406 inch per inch length of pipe. The aforementioned one inch coating of cement mortar 18 was placed over the layer of wire. In performing the above mentioned tests, the pipe was placed on two 2" x 4" wooden supports 8 feet apart. Eight 1¾" rods with I-beams surrounded the pipe and were adjusted against the end bulkheads in order to take the end thrust resulting from the hydrostatic pressure. Accompanying the hydrostatic pressures, measurements were secured, circumferentially on the pipe, for the change in the sheet and wire prestress by the use of 1" Huggenberger tensometers. The location of the strain gages was approximately in the middle of the pipe and midway between the spiral welds. The strain measurements on the sheet were taken between two adjacent wrapping wires. A hand pump was used to provide the water pressure after the pipe was filled. The data are presented in the table and are shown graphically on the curve of Figure 7.

The prestressed pipe, before the hydrostatic test, had steel stress of:

|  | P. s. i. |
|---|---|
| Wire, tension | 90,000 |
| Sheet, compression | 34,500 |

When the sheet stress in tension became 16,000 p. s. i. the pressure was 795 p. s. i. and the total steel wire stress in tension was 143,000 p. s. i.

Data and results

Change in stress in prestressed sheet and wire with internal pressure in a 24" x 11'–6" wire-wound spirally welded sheet steel pipe, 10 gauge.

| Hydrostatic pressure, p. s. i. | Huggenberger readings, ins. | | Stress, p. s. i. | |
|---|---|---|---|---|
|  | Sheet | Wire | Sheet | Wire |
| 0 | 0.00 | 0.00 | 0 | 0 |
| 60 | .16 | .15 | 4,000 | 3,700 |
| 100 | .27 | .22 | 6,700 | 5,400 |
| 150 | .37 | .34 | 9,200 | 8,400 |
| 200 | .50 | .42 | 12,400 | 10,400 |
| 250 | .64 | .53 | 15,800 | 13,100 |
| 300 | .76 | .63 | 18,800 | 15,500 |
| 350 | .90 | .75 | 22,300 | 18,500 |
| 400 | 1.01 | .85 | 25,000 | 21,000 |
| 450 | 1.12 | .97 | 27,800 | 23,900 |
| 500 | 1.23 | 1.10 | 30,500 | 27,100 |
| 550 | 1.35 | 1.26 | 33,500 | 31,100 |
| 600 | 1.46 | 1.42 | 36,200 | 35,000 |
| 600 | 1.47 | 1.45 | 36,400 | 35,800 |
| 650 | 1.62 | 1.60 | 40,200 | 39,500 |
| 700 | 1.77 | 1.77 | 43,900 | 43,700 |
| 750 | 1.92 | 1.95 | 47,600 | 48,100 |
| 800 | 2.07 | 2.17 | 51,300 | 53,500 |
| 850 | 2.27 | 2.42 | 56,300 | 59,700 |

NOTES:
(1) Pressure 300 p. s. i., fine cracks in concrete coating in line with the spiral weld.
(2) Pressure 600 p. s. i., fine longitudinal cracks in concrete coating.
(3) Pressure 850 p. s. i., test discontinued due to limit in range of testing equipment.
(4) Following release of pressure longitudinal cracks closed and some could be noted only with magnifying glass. The spiral cracks did not close.
(5) No leakage in any weld could be observed during the test.

It will be seen from the foregoing that our improved construction of pipe thus resists outwardly acting fluid pressures by first utilizing substantially the full compression strength of the pipe wall (approximately 30,000 pounds per square inch in compression), and then by utilizing the full tension strength of the pipe wall (approximately 30,000 pounds per square inch in tension). This successive utilization of the compression strength and the tension strength of the pipe wall results in a cumulative or additive value greatly exceeding either value acting alone. As a result, we have produced a pipe which is of much lower manufacturing cost, both from the standpoint of material and of labor, than prior constructions of pipe of equal strength. We have also produced a pipe which is much lighter to transport and to handle. It will be seen from the previously described data that the high tensile strength wire 15 has approximately six times the tensile strength of the pipe wall per unit of cross sectional area. This wire, in normal or average market conditions, only costs slightly over twice as much as the pipe stock per 100 pounds of weight. Hence, to produce ordinary pipe of the same strength as our improved pipe, but without utilizing the features of our invention, it would be necessary to increase the material cost of this ordinary pipe about two and a half times the material cost of our pipe.

The wrapping of steel wire 15 also strengthens the pipe against external stresses tending to crush or collapse the pipe because the high tension in the wire resists deformation of the pipe from true circular form.

While we have illustrated what we regard to be the preferred embodiments of our invention, nevertheless it will be understood that such are merely exemplary and that numerous modifications and rearrangements may be made therein without departing from the essence of the invention.

We claim:

1. A prestressed steel pipe comprising a thin-walled sheet steel pipe section, and rings of relatively thicker section welded to the opposite ends of said pipe section, and a wrapping of steel wire of high tensile strength wound around said pipe section under a tension of approximately 90,000 pounds per square inch and having such spacing between turns as to prestress the pipe to a compression pressure of approximately 30,000 pounds per square inch, the end convolutions of said wire being wound around said end rings whereby the latter prevent the possibility of the tension stress of the wire objectionably deforming the ends of said pipe section.

2. In a prestressed steel pipe, the combination of a steel pipe section of spirally welded construction, and a steel wire of high tensile strength wound spirally over said pipe section in opposition to the direction of the spiral weld, said wire being wound under a tension of at least 50,000 pounds per square inch and having such cross sectional area and spacing between turns as to establish a precompression pressure in said pipe section closely approaching the maximum compression strength of the pipe section.

3. In a prestressed steel pipe the combination of a spirally welded steel pipe section characterized by an inwardly curved wall portion adjacent the spiral weld, which curved wall portion is capable of outward expansion under internal pressure in said pipe, a high tensile strength steel wire wound around said pipe section under high tension to prestress said pipe, and a covering of concrete over said wire including a filler portion of concrete between said wire and said inwardly curved wall portion to compel the adjacent portion of said wire to flex outwardly when said wall portion flexes outwardly.

JOSEPH E. MILLER.
PAUL L. OSWEILER.